(12) United States Patent
Candau et al.

(10) Patent No.: US 6,531,561 B2
(45) Date of Patent: Mar. 11, 2003

(54) POLYMERS, THE PROCESS FOR THEIR PREPARATION AND THE INVERT LATEXES CONTAINING THEM

(75) Inventors: Francoise Candau, Strasbourg (FR); Joseph Selb, Kienheim (FR); Paul Mallo, Chatou (FR); Olivier Braun, Strasbourg (FR)

(73) Assignee: Societe d'Exploitation de Produits pour les Industries Chimiques Seppic, Paris Cedex (FR)

( * ) Notice: Subject to any disclaimer, the term of this patent is extended or adjusted under 35 U.S.C. 154(b) by 0 days.

(21) Appl. No.: 09/749,771

(22) Filed: Dec. 28, 2000

(65) Prior Publication Data

US 2001/0023284 A1 Sep. 20, 2001

(30) Foreign Application Priority Data

Dec. 28, 1999 (FR) .............................................. 99 16575

(51) Int. Cl.$^7$ .............................................. C08F 226/02
(52) U.S. Cl. .................... 526/307.6; 526/287; 526/288; 526/303.1; 526/304; 526/307; 526/307.2; 526/312; 524/812; 524/814; 524/815; 524/816
(58) Field of Search ................................. 526/287, 288, 526/303.1, 304, 307, 307.2, 307.6, 312; 524/812, 814, 815, 816

(56) References Cited

U.S. PATENT DOCUMENTS 5,834,007 A  * 11/1998  Kubota ....................... 424/443

* cited by examiner

Primary Examiner—Helen L. Pezzuto
(74) Attorney, Agent, or Firm—Young & Thompson

(57) ABSTRACT

Linear, branched or crosslinked polymer, capable of being obtained by polymerization of N-alkylacrylamide, in which the alkyl radical is linear or branched and comprises from 1 to 6 carbon atoms, with one or more monomers chosen from cationic monomers, monomers comprising at least one partially salified or completely salified strong acid functional group or monomers comprising at least one partially salified or completely salified weak acid functional group. A method of preparing the polymer is also disclosed.

14 Claims, 3 Drawing Sheets

Figure 1:
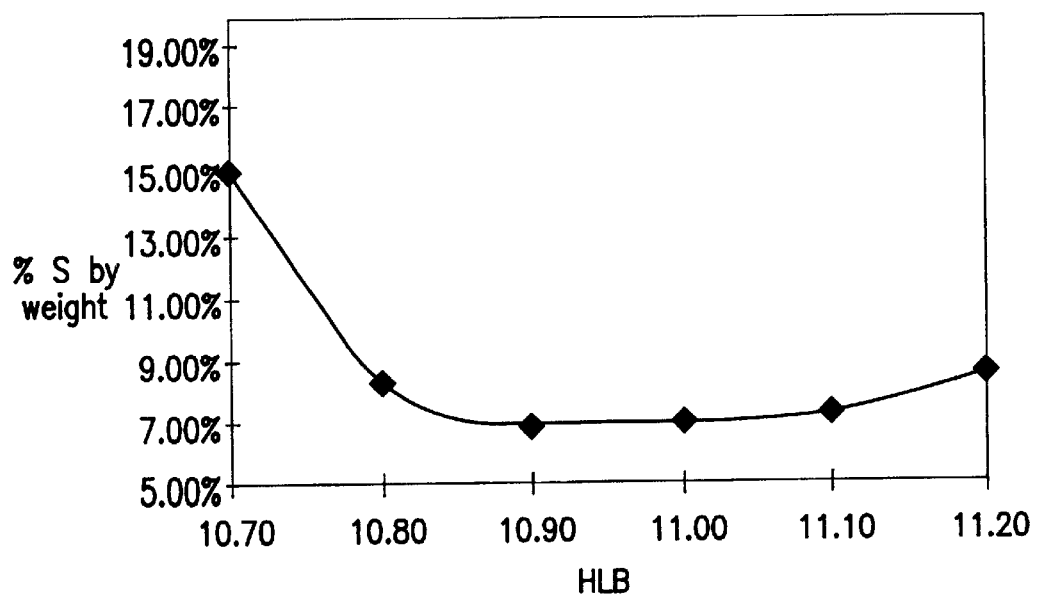

POLYMERS, THE PROCESS FOR THEIR PREPARATION AND THE INVERT LATEXES CONTAINING THEM

The present patent application relates to novel polymers, to the inverse water-in-oil microlatices comprising them and to their process of preparation. On the occasion of research directed at the development of novel inverse latices having prolonged stability over time, the Applicant Company had directed its efforts at the synthesis of polymers which result in water-in-oil microemulsions which, in comparison with conventional emulsions, are characterized by high thermodynamic stability. It has thus synthesized novel polymers which are appropriate for emulsions of this type.

According to a first aspect of the present invention, a subject-matter of the invention is a linear, branched or crosslinked polymer, characterized in that it is capable of being obtained by polymerization of N-alkylacrylamide with one or more monomers chosen from cationic monomers, monomers comprising at least one partially salified or completely salified strong acid functional group or monomers comprising at least one partially salified or completely salified weak acid functional group.

The alkyl radical substituting the acrylamide is linear or branched and comprises from one to six carbon atoms. According to a specific aspect of the present invention, the alkyl radical substituting the acrylamide is branched and is more particularly the isopropyl radical.

The term "branched polymer" is understood to denote a nonlinear polymer which has pendant chains, so as to obtain, when it is dissolved in water, a high state of entanglement which results in very high viscosities at a low gradient.

The term "crosslinked polymer" is understood to denote a nonlinear polymer which is provided in the form of a three-dimensional network which is insoluble in water but swellable in water and which results in a chemical gel being obtained.

The polymer according to the invention can comprise either crosslinked units or else branched units or else branched units and crosslinked units.

The strong acid functional group of the monomer comprising it is in particular the partially salified or completely salified sulphonic acid functional group or phosphonic acid functional group. The said monomer is, for example, partially salified or completely salified styrenesulphonic acid or partially salified or completely salified 2-methyl-2-[(1-oxo-2-propenyl)amino]-1-propanesulphonic acid.

The weak acid functional group of the monomer comprising it is in particular the partially salified or completely salified carboxylic acid functional group, such as, for example, partially salified or completely salified 3-methyl-3-[(1-oxo-2-propenyl)amino]butanoic acid.

The cationic monomer is chosen particularly from quaternary ammonium derivatives. Examples of cationic monomers are the 2,N,N,N-tetramethyl-2-[(1-oxo-2-propenyl) amino]propanammonium, 2,N,N-tri-methyl-2-[(1-oxo-2-propenyl)amino]propanammonium or N,N,N-trimethyl-3-[(1-oxo-2-propenyl)amino]propanammonium salts.

The term "salified" is understood to denote, for the strong or weak acid functional groups, the alkali metal salts, such as the sodium salt or the potassium salt, or the nitrogenous base salts, such as, for example, the ammonium salt or the monoethanolamine salt (HO—CH$_2$—CH$_2$—NH$_3^+$).

A particular subject-matter of the invention is a polymer as defined above capable of being obtained by polymerization of an N-alkylacrylamide with one or more monomers having a 1-oxo-2-propenyl radical and more particularly a polymer capable of being obtained by polymerization of N-isopropylacrylamide with one or more monomers chosen from 2,N,N,N-tetramethyl-2-[(1-oxo-2-propenyl)amino] propanammonium halides, 2,N,N-trimethyl-2-[(1-oxo-2-propenyl)amino]propanammonium halides or N,N,N-trimethyl-3-[(1-oxo-2-propenyl)amino]propanammonium halides, partially or completely salified 3-methyl-3-[(1-oxo-2-propenyl)amino]butanoic acid or partially or completely salified 2-methyl-2-[(1-oxo-2-propenyl)amino]-1-propanesulphonic acid.

Examples of such polymers are those capable of being obtained by copolymerization of N-isopropylacrylamide with sodium 3-methyl-3-[(1-oxo-2-propenyl)amino] butanoate or with sodium 2-methyl-2-[(1-oxo-2-propenyl) amino]-1-propanesulphonate and those capable of being obtained by terpolymerization of N-isopropylacrylamide with a monomer chosen from sodium 3-methyl-3-[(1-oxo-2-propenyl)amino]butanoate or sodium 2-methyl-2-[(1-oxo-2-propenyl)amino]-1-propanesulphonate and a monomer chosen from 2,N,N,N-tetramethyl-2-[(1-oxo-2-propenyl) amino]propanammonium chloride, 2,N,N-trimethyl-2-[(1-oxo-2-propenyl)amino]propanammonium chloride or N,N, N-trimethyl-3-[(1-oxo-2-propenyl)amino] propanammonium chloride.

According to a second aspect of the present invention, a subject-matter of the invention is a process for the preparation of a polymer as defined above, characterized in that:

a) an aqueous solution comprising the monomers and the optional additives, such as a crosslinking and/or branching agent, is emulsified in an oily phase in the presence of one or more surface-active agents, so as to form a microemulsion, b) the polymerization reaction is initiated and then the said reaction is allowed to take place in order to form an inverse microlatex, and then c) the said polymer is isolated.

The surface-active agent or the mixture of surface-active agents employed generally has an HLB number of greater than or equal to 9. The amount used is between approximately 5% by weight and approximately 10% by weight of the microemulsion.

A more particular subject-matter of the invention is a process as described above in which the mixture of surfactants employed comprises a mixture of at least one emulsifying agent of the water-in-oil type with at least one emulsifying agent of the oil-in-water type.

The term "emulsifying agent of the water-in-oil type" is understood to denote emulsifying agents having an HLB value which is sufficiently low to provide water-in-oil emulsions, such as sorbitan esters, for example sorbitan monooleate, sold by Seppic under the name Montane™ 80, sorbitan isostearate, sold by Seppic under the name Montane™ 70, or sorbitan sesquioleate, sold by Seppic under the name Montane™ 83.

The term "emulsifying agent of the oil-in-water type" is understood to denote emulsifying agents having an HLB value which is sufficiently high to provide oil-in-water emulsions, such as ethoxylated sorbitan esters, for example sorbitan oleate ethoxylated with 20 mol of ethylene oxide, sold by Seppic under the name of Montanox™ 80, decaethoxylated oleocetyl alcohol, sold by Seppic under the name of Simulsol™ OC 710, or polyethoxylated sorbitan hexaoleates, sold by Atlas Chemical Industries under the names G-1086 and G-1096.

The oily phase of the microemulsion is composed either of a commercial mineral oil comprising saturated hydrocarbons, such as paraffins, isoparaffins or cycloparaffins, which exhibits, at ambient temperature, a relative density of between 0.7 and 0.9 and a boiling point of greater than 180° C., such as, for example, Isopar™, Exxsol™ D 100 S or Marcol™ 52, sold by Exxon Chemical, isohexadecane or isododecane, or a mixture of several of these oils.

Isohexadecane, which is identified in Chemical Abstracts by the number RN=93685-80-4, is a mixture of $C_{12}$, $C_{16}$ and $C_{20}$ isoparaffins comprising at least 97% of $C_{16}$ isoparaffins, among which the main constituent is 2,2,4,4,6,8,8-heptamethylnonane (RN=4390-04-9). It is sold in France by Bayer. Marcol™ 52 is a commercial oil corresponding to the definition of liquid petrolatums the French Pharmacopoeia. It is a white mineral oil in accordance with the FDA 21 CFR 172.878 and CFR 178.3620 (a) regulations and it is included in the Pharmacopoeia of the USA, US XXIII (1995), and in the European Pharmacopoeia (1993).

If appropriate, the crosslinking and/or branching agent employed in the process as defined above is a diethylene or polyethylene compound in the molar proportion, expressed with respect to the monomers employed, of 0.005% to 1% and preferably from 0.01% to 0.2% and more particularly of 0.01% to 0.1%. It is, for example, ethylene glycol dimethacrylate, sodium diallyloxyacetate, ethylene glycol diacrylate, diallylurea, trimethylolpropane triacrylate or methylenebis(acrylamide).

The aqueous phase employed in stage a) of the process described above can comprise up to 50% of its weight of monomer.

The microlatex obtained on conclusion of stage b) comprises between approximately 20% and 50% by weight of water.

The process as described above can be employed batchwise, semi-continuously or continuously.

According to the final aspect of the present invention, the subject-matter of the invention is an inverse microlatex capable of being obtained by the implementation of stages a) and b) of the process as defined above.

The following examples illustrate the invention without, however, limiting it.

I) Preparation of the monomers

1)—N-Isopropylacrylamide (NIPAM)

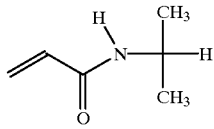

NIPAM is a commercial product sold in France by Acros. Before use thereof, it is recrystallized twice from a toluene/cyclohexane mixture and dried under vacuum for 24 h.

2)—3-Acrylamidopropyltrimethylammonium chloride (APTAC)

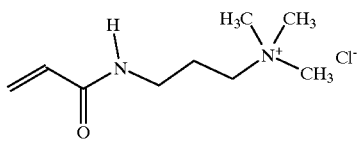

APTAC is a commercial product sold in France by Stockhausen in the form of a 60% by weight aqueous solution.

3)—2-Acrylamido-2-methylpropanesulphonic acid (AMPS)

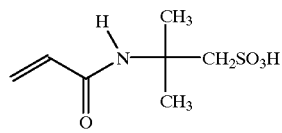

AMPS is a commercial product sold in France by Lubrizol. It is used subsequently in the form of a 50% by weight aqueous solution of its sodium salt, prepared by addition of powdered AMPS to an aqueous sodium hydroxide solution cooled in a bath of cold water and then adjustment of the pH to 9.

4)—3-Methyl-3-[(1-oxo-2-propenyl)amino]butanoic acid (AMBA)

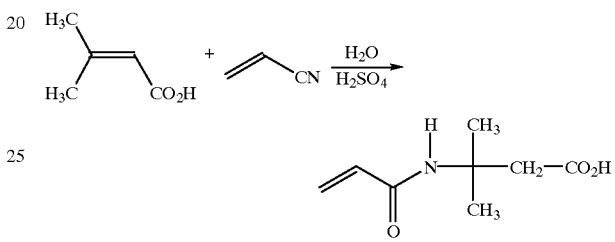

The compound is prepared by the method of D. Hoke et al. (J. Polym. Sci., Polym. Chem. Ed., 10, p. 3311, 1972).

15 g (0.15 mol) of 3,3-dimethylacrylic acid, recrystallized beforehand from acetone, are mixed with 7.95 g (0.15 mol) of acrylonitrile, 1.35 g (0.075 mol) of water and a catalytic amount of tert-butylcatechol. The mixture is cooled to approximately 5° C. and then 30.38 g (0.31 mol) of sulphuric acid are added dropwise while maintaining the temperature in the vicinity of 10° C. The mixture is left overnight with stirring at ambient temperature. The medium is subsequently cooled to 5° C. and then 100 ml of water are added, filtration is carried out, extraction with chloroform is carried out, and the extract is dried, filtered and evaporated. After recrystallization from a methyl ethyl ketone/petroleum ether mixture, 9.3 g of crystals of the expected product are obtained (yield: 36.25%). Proton NMR ($CDCl_3$; δ in ppm)

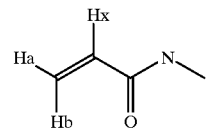

1.49 (s, 6H): $CH_3$; 2.82 (s, 2H): $CH_2$—$CO_2H$; 5.63 (dd, 1H): Ha; 6.10 (dd, 1H): Hx; 6.2 (dd, 1H): Hb; 6.25 (s, 1H) CO—NH.

Coupling constants of the acryl system: $J_{ab}$=1.88 Hz; $J_{ax}$=9.81 Hz; $J_{bx}$=16.94 Hz.

5)—N-[1,1-dimethyl-2-(dimethylamino)ethyl] acrylamide (AMPDA)

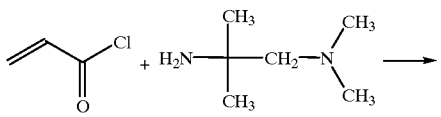

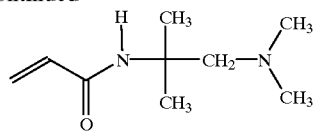

The compound is prepared by the method of C. McCormick et al. (Polymer, 27, p. 1971, 1986).

18 g (0.155 mol) of N,N,2-trimethyl-1,2-propanediamine, sold by Angus, are mixed with 150 cm³ of anhydrous tetrahydrofuran. The mixture is cooled to approximately 5° C. and then 15.45 g (0.17 mol) of acryloyl chloride are added dropwise. The mixture is left overnight with stirring at ambient temperature. The mixture is filtered, the precipitate is washed with tetrahydrofuran, dried and then dissolved in 150 cm³ of water, the solution is brought to pH=12 and extracted with methyl ethyl ketone, and the extract is dried, filtered and evaporated. After recrystallizing from a methyl ethyl ketone/petroleum ether mixture, the crystals of the expected product are obtained (yield: approximately 90%)

Proton NMR (CDCl₃; δ in ppm)

1.40 (s, 6H): $CH_3$—C; 2.33 (s, 6H) : $CH_3$—N; 2.45 (s, 2H): N—$CH_2$—C; 5.56 (dd, 1H): Ha; 6.08 (dd, 1H): Hx; 6.23 (dd, 1H): Hb; 6.20 (s, 1h): CO—NH; Coupling constants of the acryl system: $J_{ab}$=2.42 Hz; $J_{ax}$=9.41 Hz; $J_{bx}$=16.94 Hz.

6)—2-Acrylamido-2-methylpropyltrimethylammonium chloride (AMPTAC)

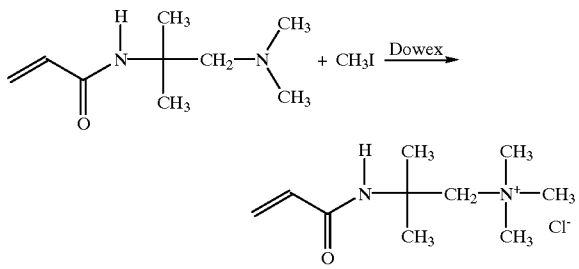

The compound is prepared by the method of C. McCormick et al. (Polymer, 27, p. 1971, 1986).

4.3 g (0.025 mol) of AMPDA are dissolved in 100 cm³ of anhydrous ether, 35.9 g (0.253 mol) of methyl iodide are added and the mixture is left stirring for 2 days. After filtration, washing with ether and then drying under vacuum, the iodide obtained is dissolved in 50 cm³ of water and the solution is stirred in ion-exchange resin (Dowex™ Cl⁻) for one hour. After filtration, washing with water and precipitating from acetone, the desired AMPTAC is obtained.

II)—Preparation of the microemulsions

1)—The oil

Isopar™ M, sold in France by Exxon, is used.

2)—The surfactants

The addition of an appropriate amount of surfactants makes it possible to move from the emulsion to the microemulsion, which is reflected by the achievement of a completely transparent system. The surfactants are characterized by their HLB values. The HLB concept is based on experimental methods related to the observation of the stability of an emulsion and attributes the values from 1 to 20 to the surfactants. This number is a measure of the emulsifying capability and reflects the hydrophilic-lipophilic balance. It has been shown that the use of a mixture of emulsifiers, one with a high HLB and the other with a low HLB, results in the formation of a more stable emulsion than that obtained with a single surfactant with an equivalent HLB. This is because the two emulsifiers can form a stable complex via intermolecular associations. Several surfactants were tested:

| Commercial name | HLB | Description |
| --- | --- | --- |
| Montane ™ 83 VG | 3.7 | sorbitan sesquioleate |
| G 1086 | 10.2 | polyethoxylated sorbitan hexaoleate |
| G 1096 | 11.4 | polyethoxylated sorbitan hexaoleate |
| Montanox ™ 80 | 15 | polyethoxylated sorbitan monooleate |
| Oramide ™ ML 802 | 5.4 | monoethanolamine oleamide |
| Oramide ™ ML 835 | 9 | polyethoxylated monoethanolamine oleamide |
| Simulsol ™ OC 72 | 4.9 | diethoxylated oleocetyl alcohol |
| Simulsol ™ OC 710 | 12.4 | decaethoxylated oleocetyl alcohol |

3—Procedure for the formulation

The move from the emulsion to the microemulsion is carried out by addition of surfactants to the aqueous phase/oil mixture. Various aqueous phases were prepared by mixing a 50% by weight solution of sodium salt of 2-acrylamido-2-methylpropanesulphonic acid (AMPSNa), a 50% by weight solution of 3-acrylamidopropyltrimethylammonium chloride (APTAC) or a 50% by weight solution of sodium salt of 3-methyl-3-[(1-oxo-2-propenyl)amino]butanoic acid (AMBANa) with a 22% by weight solution of N-isopropylacrylamide (NIPAM), so that the level of monomers present in the aqueous phase is between 44% and 35% by weight. After addition of the oil, a mixture of surfactants with a known HLB is then added with stirring until the system becomes transparent.

The curve in FIG. 1 represents the minimum percentages by weight necessary as a function of their HLB number, for various Montane™ 83/G1096 mixtures, in order to form a microemulsion from an aqueous phase/Isopar™ mixture comprising the ternary mixture of NIPAM/AMPSNa/APTAC monomers in the relative molar proportions 20/60/20.

Figure 2:
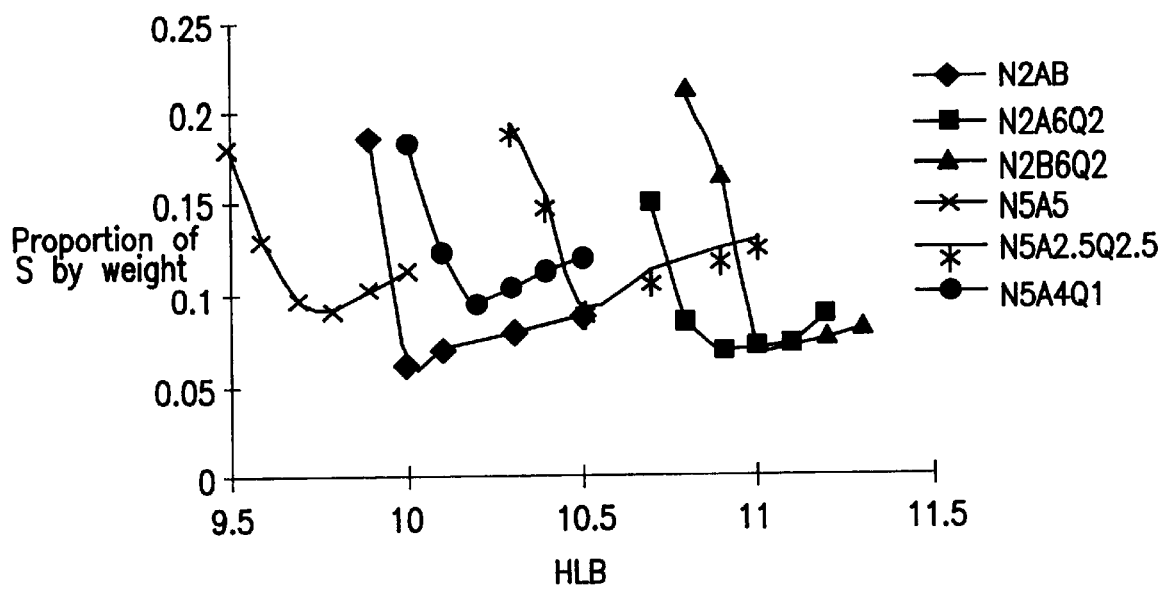

The curves in FIG. 2 represent the minimum percentages by weight necessary as a function of their HLB number, for various Montane™ 83/G1096 mixtures, in order to form a microemulsion from an aqueous phase/Isopar™ M mixture comprising various binary or ternary mixtures of monomers. These mixtures are as follows (expressed as molar proportions of monomers):

| Mixtures | NIPAM | AMPSNa | AMBNa | APTAC |
| --- | --- | --- | --- | --- |
| N2A8 | 20% | 80% | 0% | 0% |
| N2A6Q2 | 20% | 60% | 0% | 20% |
| N2B6Q2 | 20% | 0% | 60% | 20% |
| N5A5 | 50% | 50% | 0% | 0% |
| N5A2.5Q2.5 | 50% | 25% | 0% | 25% |
| N5A4Q1 | 50% | 40% | 0% | 10% |

The minimum levels by weight of surfactants necessary for the achievement of an inverse microemulsion from various mixtures of monomers, for an optimum HLB number, are summarized in the following table.

| Mixtures of monomers (molar proportions) | Optimum HLB number for obtaining the minimum percentage by weight of surfactants | Minimum % by weight of surfactants necessary |
|---|---|---|
| NIPAM: 33.3% AMPSNa: 66.6% | 10.1 | 8.2 |
| NIPAM: 20% AMPSNa: 80% | 10 | 6.1 |
| NIPAM: 50% AMPSNa: 50% | 9.7 | 9 |
| NIPAM: 20% AMPSNa: 40% APTAC: 40% | >11.4 | |
| NIPAM: 33.3% AMPSNa: 33.3% APTAC: 33.3% | 11.3 | 8.9 |
| NIPAM: 20% AMPSNa: 60% APTAC: 20% | 10.9 | 6.9 |
| NIPAM: 20% AMBNa: 60% APTAC: 20% | 11 | 7 |
| NIPAM: 50% AMPSNa: 25% APTAC: 25% | 10.5 | 9.3 |
| NIPAM: 50% AMPSNa: 40% APTAC: 10% | 10.2 | 9.6 |

III)—Polymerization

A)—Batchwise synthesis

1)—Preparation of NIPAM/AMPSNa copolymers

The amounts are shown for 3 g of copolymer with an NIPAM/AMPSNa molar composition equal to 20/80. 0.009 g of 2,2'-azobis(isobutyronitrile) (AIBN) is dissolved in 6.847 g of filtered Isopar™ M. An aqueous solution comprising the monomers is prepared by mixing 5.341 g of a 50% by weight AMPSNa solution, 0.329 g of NIPAM, which has been recrystallized twice, and 1.177 g of water. 6.847 g of this aqueous phase are added to the oily phase and the mixture is made up to volume with 1.867 g of the mixture of surfactants Montane™ 83/G1096 (i.e. 12% by weight; HLB number=10.2). The level of monomers is 19.27% by weight. The mixture thus prepared is stirred in order to form the microemulsion more rapidly (microemulsification is in fact a spontaneous phenomenon). The microemulsion is subsequently irradiated with ultraviolet radiation at 20° C. in a nitrogen atmosphere for 1 hour and a half. The final appearances of the microlatices obtained are as follows:

| Example | Composition (molar %) | HLB | % S | Appearance |
|---|---|---|---|---|
| 1 | NIPAM: 20% AMPSNa: 80% | 10 | 12 | clear |
| 2 | NIPAM: 20% AMPSNa: 80% | 10.5 | 12 | deposited |
| 3 | NIPAM: 20% AMPSNa: 80% | 10 | 10 | clear |
| 4 | NIPAM: 50% AMPSNa: 50% | 9.8 | 12 | opaque |
| 5 | NIPAM: 20% AMPSNa: 80% | 10 | 8 | deposited |
| 6 | NIPAM: 20% AMPSNa: 80% | 10 | 14 | clear |

2)—Preparation of NIPAM/AMPSNa/APTAC terpolymers

The amounts are shown for 3 g of terpolymer with an NIPAM/AMPSNa/APTAC molar composition equal to 20/60/20. 0.009 g of AIBN is dissolved in 6.866 g of filtered Isopar™. An aqueous solution comprising the monomers is prepared by mixing 5.461 g of a 50% by weight AMPSNa solution, 1.642 g of a 50% by weight APTAC solution, 0.449 g of NIPAM, which has been recrystallized twice, and 1.604 g of water. 6.847 g of this aqueous phase are added to the oily phase and the mixture is made up to volume with 2.235 g of the mixture of surfactants Montane™ 83/G1096 (i.e. 14% by weight; HLB number=10.9). The level of monomers is 18.93% by weight. The mixture thus prepared is stirred in order to form the microemulsion more rapidly (microemulsification is in fact a spontaneous phenomenon). The microemulsion is subsequently irradiated with ultraviolet radiation at 20° C. in a nitrogen atmosphere for 1 hour and a half. The final appearances of the microlatices obtained are as follows:

| Example | Composition (molar %) | HLB | % S | Appearance |
|---|---|---|---|---|
| 7 | NIPAM: 20%; AMPSNa: 60% APTAC: 20% | 10.9 | 14 | clear |
| 8 | NIPAM: 20%; AMPSNa: 60% APTAC: 20% | 10.5 | 12 | deposited |
| 9 | NIPAM: 50%; AMPSNa: 25% APTAC: 25% | 10.5 | 15 | deposited |
| 10 | NIPAM: 50%; AMPSNa: 25% APTAC: 25% | 10.5 | 18 | opaque |
| 11 | NIPAM: 50%; AMPSNa: 40% APTAC: 10% | 10.2 | 15 | deposited |
| 12 | NIPAM: 50%; AMPSNa: 40% APTAC: 10% | 10.2 | 18 | opaque |

3)—Preparation of NIPAM/AMBNa/APTAC terpolymers

The synthesis is similar to the preceding synthesis, AMPSNa being replaced with AMBNa. For a terpolymer with an NIPAM/AMBNa/APTAC molar composition equal to 20/60/20, the aqueous phase is prepared with 3.867 g of a 50% by weight AMBNa solution, 1.379 g of a 50% by weight APTAC solution, 0.377 g of NIPAM and 1.347 g of water. The mass of Isopar™ M introduced is 6.970 g and the mass of surfactants introduced is 2.269 g (HLB number=11, i.e. 14% by weight). The level of monomers is 18.50% by weight. The final appearance of the microlatex obtained is as follows:

| Example | Composition (molar %) | HLB | % S | Appearance |
|---|---|---|---|---|
| 13 | NIPAM: 20%; AMBNa: 60% APTAC: 20% | 11 | 14 | clear |

4)—Isolation of the polymers and purification a) When the polymerization is complete, the microlatex is slowly poured into an excess of isopropanol and the polymer is allowed to precipitate. After filtration, washing with isopropanol and then with acetone, and drying for 48 h in a vacuum oven at 40° C., the polymer is isolated.

b) In order to remove any saline residue, the polymer obtained in the preceding paragraph a) is redissolved in a molar sodium chloride solution and then the solution is poured into dialysis bags, which are hermetically sealed. The said bags are then immersed in distilled water and dialysis is allowed to take place for one week, the water being changed one to two times daily. The polymer is subsequently isolated by lyophilization.

The following polymers were thus precipitated, washed, dialysed and lyophilized.

| Example | Composition (molar %) | HLB | % S |
|---|---|---|---|
| 14 | NIPAM: 20%; AMPSNa: 60% APTAC: 20% | 10.9 | 14% |
| 15 | NIPAM: 50%; AMPSNa: 40% APTAC: 10% | 10.2 | 18 |
| 16 | NIPAM: 20%; AMBNa: 60% APTAC: 20% | 11 | 14 |
| 17 | NIPAM: 50%; AMPSNa: 25% APTAC: 25% | 10.5 | 18 |

5)—Analysis of the polymers a)—Determination of the molar mass by static light scattering The measurements of static light scattering were made using an Amtec™ MM1 SM200 device with a laser with a wavelength of 633 nm as light source and a decimolar sodium chloride solution as solvent. The mother solution comprises 0.8 g/l of polymer. Dust is removed from the solutions by centrifuging at 20 000 revolutions/min for 2 h.

Figure 3:
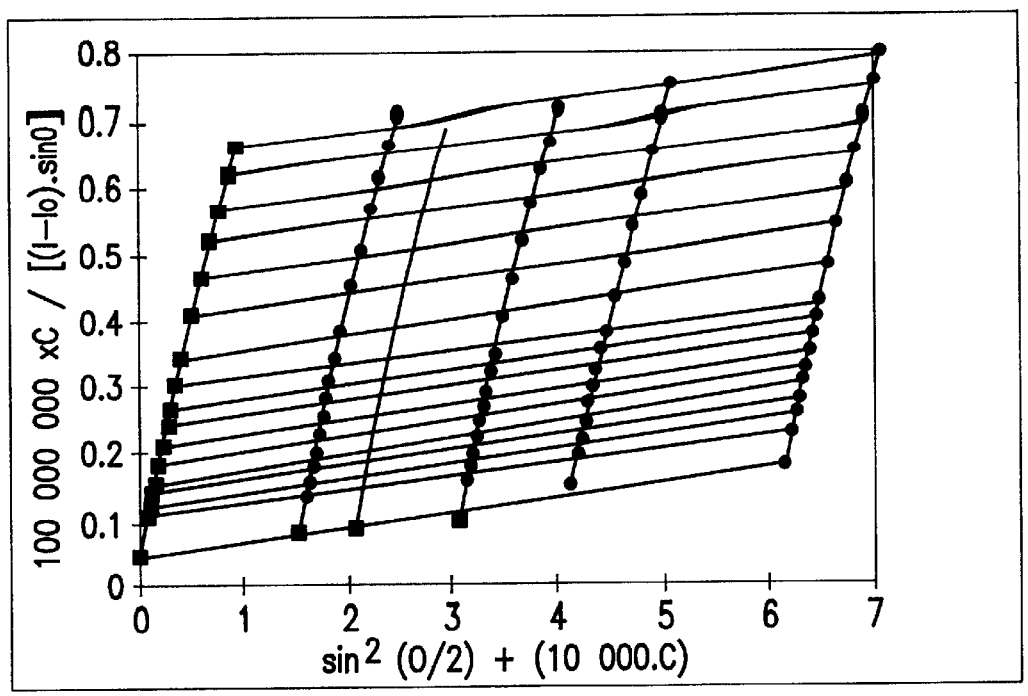

FIG. 3 represents the Zimm diagram of the NIPAM/AMPSNa/APTAC (20/60/20) terpolymer.

Figure 4:
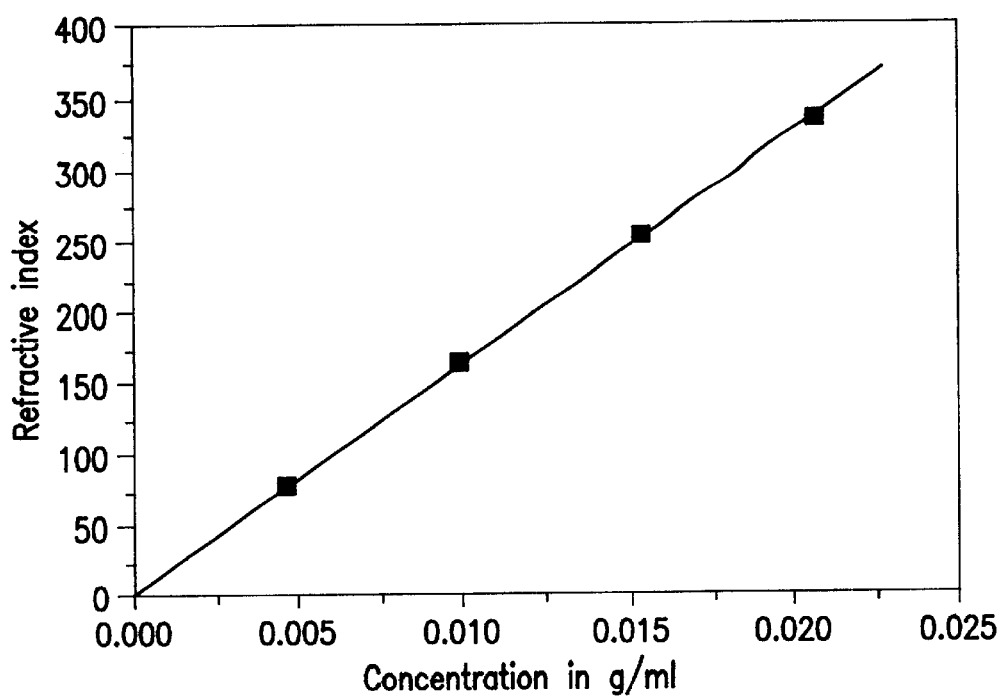

FIG. 4 represents the curve of the refractive indices of saline aqueous solutions (NaCl: 0.1 molar) of the NIPAM/AMPNa/APTAC terpolymer (molar proportions of monomers: 20/60/20) measured with a Brice Phoenix™ differential refractometer at a wavelength of 633 nm. It makes it possible to determine the increments in refractive index dn/dC. In the present case, dn/dC is equal to 0.153.

A very high molar mass, of the order of $13 \times 10^6$, is deduced from the Zimm diagram in FIG. 3.

B)—Semi-continuous syntheses

1) With particle initiator (AIBN+UV)

Figure 5:
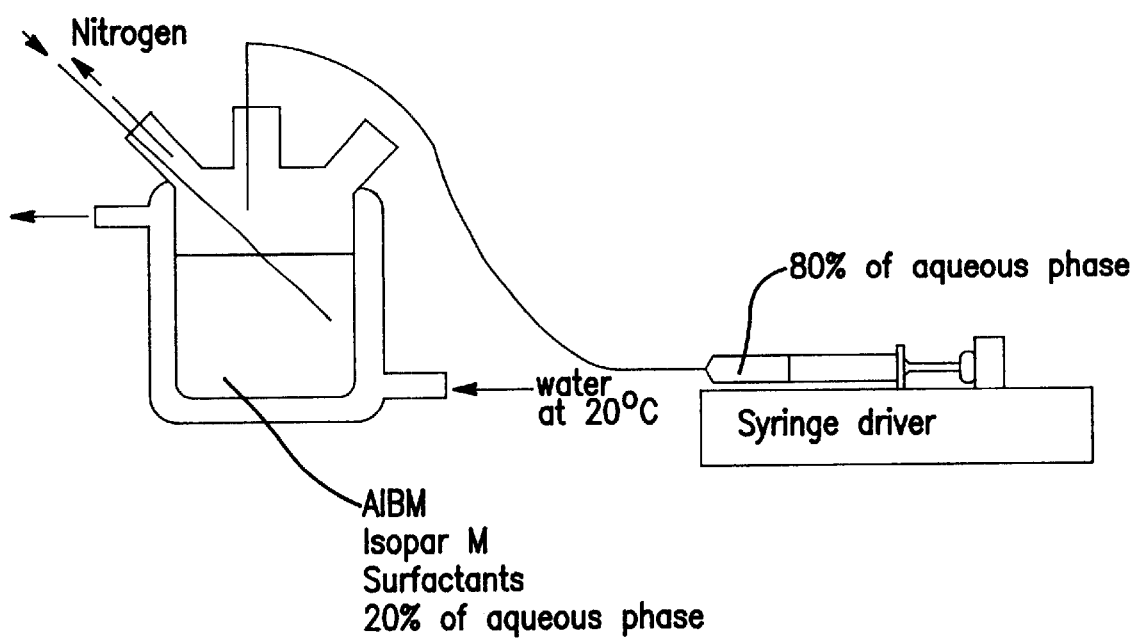

The semi-continuous synthesis is carried out in the device represented in FIG. 5.

The AIBN is dissolved in the Isopar™ M. The aqueous phase comprising monomers (NIPAM/AMPSNa/APTAC 20/60/20) is prepared. When the two phases are clear, 20% of the aqueous phase is added to the Isopar™ and then the mixture of surfactants (8% by weight). The microemulsion is obtained by stirring the mixture. The microemulsion is poured into the three-necked jacketed reactor and thermostatically controlled at 20° C.; it is degassed by sparging with nitrogen for 30 minutes. The unused 80% of the aqueous phase is also degassed and then introduced into a syringe which is positioned on a syringe driver and which is connected to the reactor. After irradiating the microemulsion with ultraviolet rays for 5 minutes, in order to initiate the polymerization reaction, the aqueous solution is injected continuously over 50 minutes. The results of tests are recorded in the following table:

| Example | Composition (molar %) | HLB | % S | Appearance |
|---|---|---|---|---|
| 18 | NIPAM: 20%; AMPSNa: 60% APTAC: 20% | 10.9 | 8% | clear |
| 19 | NIPAM: 20%; AMPSNa: 60% APTAC: 20% | 10.9 | 6% | deposited |
| 20 | NIPAM: 50%; AMPSNa: 25% APTAC: 25% | 10.9 | 7% | deposited |
| 21 | NIPAM: 50%; AMPSNa: 40% APTAC: 10% | 10.2 | 10% | opaque | b) With redox initiator (cumene hydroperoxide/thionyl chloride couple)

The procedure for the mixing of 20/60/20 NIPAM/AMPSNa/APTAC monomers is as follows:

A 1% by weight solution of cumene hydroperoxide in Isopar™ M is prepared and then a 2% by weight solution of thionyl chloride in Isopar™ is prepared. The amounts of initiator used are 0.015 molar % with respect to the monomers for the cumene hydroperoxide and 0.23 molar % for the thionyl chloride. The two solutions are degassed with nitrogen before use.

A microemulsion is prepared by mixing 6.866 g of aqueous phase comprising monomers, 6.866 g of Isopar™ M and 2.235 g of surfactants and then by stirring. The microemulsion is poured into a three-necked jacketed reactor thermostatically controlled at 20° C. and degassed with nitrogen for 30 minutes. Subsequently, 41 mg of cumene hydroperoxide solution are injected, followed, over 50 minutes, by 241 mg of thionyl chloride solution.

IV—Viscometric properties of the polymers in solution

1)—Definitions of the parameters measured a) The apparent viscosity

The apparent viscosity $\eta_{app}$ is that which is given by the experimental measurement and is expressed in Pa·s and the viscosity $\eta$ is then extrapolated to zero gradient.

b)—The specific viscosity

So as to eliminate the effects of solvent, the specific viscosity $\eta_{sp}$ is defined: $\eta_{sp}=(\eta-\eta_0)/\eta_0$, $\eta_0$ being the viscosity of the solvent.

c)—The reduced viscosity

In order to take into account the concentration of polymer (C) in the solution, the reduced viscosity $\eta_{red}$ is defined, expressed in cm$^3$/g: $\eta_{red}=\eta_{sp}/C$.

d)—The intrinsic viscosity

The intrinsic viscosity, expressed in cm$^3$/g, is the extrapolation of the reduced viscosity to zero concentration $[\eta]= \lim_{c \to 0} \eta_{red}$.

The Huggins equation also connects these parameters with $k_H$ (Huggins coefficient), which reflects the solute/solvent interactions.

$$\eta_{red} = [\eta] + [\eta]^2 k_H C$$

2)—Viscometric properties of the NIPAM/AMPSNa/APTAC (20/60/20) terpolymer

The device used is of "bearing" type. It is a Low Shear™ 30 from Contraves, which operates at a low rate gradient (between 0.01 and 128 s$^{-1}$) and thus makes it possible to measure relatively low apparent viscosities. Firstly, the specific viscosity of a 20/60/20 NIPAM/AMPSNa/APTAC polymer is determined as a function of its concentration in a decimolar aqueous sodium chloride solution. Several solutions are prepared from a mother solution comprising 1% by weight of terpolymer. The device is thermostatically controlled at 25° C. and the measuring component recorded as 2T—2T, which makes it possible to obtain the greatest accuracy, is used. The viscosity measurements are made at a controlled rate gradient; the device measures the stress which results therefrom and calculates the apparent viscosity $\eta_{app}$, which is equal to the quotient of the stress by the rate gradient.

For a 1% by weight solution of 20/60/20 NIPAM/AMPSNa/APTAC, an enormous difference in specific viscosity at 25° C. is found, according to whether the solvent is pure water ($\eta_{sp}=1785$) or a decinormal aqueous sodium chloride solution ($\eta_{sp}=108$).

3)—Viscometric properties of the NIPAM/AMPSNa/AMPTAC (50/25/25) terpolymer a) A first series of measurements is carried out with the device described in the preceding paragraph. It is found, first of all, that the dilute system lies below 10$^{-3}$ g/ml at 25° C.

The Huggins coefficient $k_H$ calculated from the slope is of the order of 0.45, which means that the polymer is in a good solvent medium ($0.3<k_H<0.5$). The relatively high value (767 cm³/g) of the intrinsic viscosity [η], which reflects the hydrodynamic radius, is due to the high mass of the polymers. At 40° C., the value of [η] is higher (933 cm³/g) and thus the hydrodynamic volume measured is greater.

A second series of measurements is carried out with a Haake Rheostress™ RS100 rheometer in order to study the behaviour of a molar aqueous sodium chloride solution comprising 4% by weight of 50/25/25 NIPAM/AMPSNa/AMPTAC terpolymer. This rheometer operates according to a principle different from the preceding one as it imposes a stress and measures the rate gradient which results therefrom. It subsequently calculates the apparent viscosity. The measurements are made at 25° C. using a 60 mm plate and a 60 mm cone with a slope of 1°. Two stresses (0.2 Pa and 80 Pa) are alternated and the apparent viscosity is recorded as a function of time. The shear-thinning nature of the polymer is recorded (the value changes from 5.7 Pa·s to 0.2 Pa·s). After returning to a low stress, the system takes time to equilibrate (approximately 2 minutes).

What is claimed is:

1. A linear, branched or crosslinked polymer, wherein said polymer is capable of being obtained by polymerization of N-isopropyl acrylamide with one or more monomers chosen from cationic monomers, monomers comprising at least one partially salified or completely salified strong acid functional group or partially salified or completely salified 3-methyl 3-[(1-oxo-2-propenyl)amino]butanoic acid, wherein the molar portion of N-isopropyl acrylamide monomer unit in said polymer is less than or equal to 50%.

2. Polymer as defined in claim 1, in which the strong acid functional group of the monomer comprising it is the partially salified or completely salified sulphonic acid functional group or phosphonic acid functional group.

3. Polymer as defined in claim 2, in which the monomer comprising a strong acid functional group is partially salified or completely salified styrenesulphonic acid or partially salified or completely salified 2-methyl-2-[(1-oxo-2-propenyl)-amino]-1-propanesulphonic acid.

4. Polymer as defined in claim 1, in which the cationic monomer is a quaternary ammonium derivative.

5. Polymer as defined in claim 4, in which the cationic monomer is a 2,N,N,N-tetramethyl-2-[(1-oxo-2-propenyl)amino]propanammonium, 2,N,N-trimethyl-2-[(1-oxo-2-propenyl)amino]propanammonium or N,N,N-trimethyl-3-[(1-oxo-2-propenyl)amino]propanammonium salt.

6. Polymer as defined in claim 1, capable of being obtained by polymerization of an N-alkylacrylamide with one or more monomers having a 1-oxo-2-propenyl radical.

7. Polymer as defined in claim 6, capable of being obtained by polymerization of N-isopropylacrylamide with one or more monomers chosen from 2,N,N,N-tetramethyl-2-[(1-oxo-2-propenyl)amino]propanammonium, 2,N,N-trimethyl-2-[(1-oxo-2-propenyl)amino]propanammonium or N,N,N-trimethyl-3-[(1-oxo-2-propenyl)amino] propanammonium halides, partially or completely salified 3-methyl-3-[-(1-oxo-2-propenyl)amino]butanoic acid or partially or completely salified 2-methyl-2-[(1-oxo-2-propenyl)amino]-1-propanesulphonic acid.

8. Polymer as defined in claim 7, capable of being obtained by copolymerization of N-isopropylacrylamide with sodium 3-methyl-3-[(1-oxo-2-propenyl)amino]butanoate or with sodium 2-methyl-2-[(1-oxo-2-propenyl)amino]-1-propanesulphonate.

9. Polymer as defined in claim 7, capable of being obtained by terpolymerization of N-isopropylacrylamide with a monomer chosen from sodium 3-methyl-3-[(1-oxo-2-propenyl)amino]butanoate or sodium 2-methyl-2-[(1-oxo-2-propenyl)amino]-1-propane-sulphonate and a monomer chosen from 2,N,N,N-tetramethyl-2-[(1-oxo-2-propenyl) amino]propanammonium chloride, 2,N,N-trimethyl-2-[(1-oxo-2-propenyl)amino]propanammonium chloride or N,N,N-trimethyl-3-[(1-oxo-2-propenyl)amino]propanammonium chloride.

10. Process for the preparation of a polymer as defined in claim 1, characterized in that:

a) an aqueous solution comprising the monomers and optional additives is emulsified in an oily phase in the presence of one or more surface-active agents, so as to form a microemulsion, b) the polymerization reaction is initiated and then said reaction is allowed to take place in order to form an inverse microlatex, and then c) said polymer is isolated.

11. Process as defined in claim 10, in which the surface-active agent or the mixture of surface-active agents employed has an HLB number of greater than or equal to 9.

12. Process as defined in claim 11, in which the mixture of surfactants employed comprises a mixture of at least one emulsifying agent of the water-in-oil type with at least one emulsifying agent of the oil-in-water type.

13. Process as defined in claim 10, characterized in that it is carried out batchwise, semi-continuously or continuously.

14. Inverse microlatex, capable of being obtained by the implementation of stages a) and b) of the process as defined in claim 10.

* * * * *